United States Patent

[11] 3,568,156

[72] Inventor Kenneth L. Thompson
Chatham Township, Morris County, N.J.
[21] Appl. No. 659,389
[22] Filed Aug. 9, 1967
[45] Patented Mar. 2, 1971
[73] Assignee Bell Telephone Laboratories, Incorporated
Murray Hill, N.J.

[54] TEXT MATCHING ALGORITHM
8 Claims, 3 Drawing Figs.

[52] U.S. Cl. ........ 340/172.5
[51] Int. Cl. ........ G06f 7/34
[50] Field of Search ........ 340/172.5

[56] References Cited

UNITED STATES PATENTS

| | | | |
|---|---|---|---|
| 3,107,343 | 10/1963 | Poole | 340/172.5 |
| 3,147,343 | 9/1964 | Meyer et al. | 340/172.5 |
| 3,290,661 | 12/1966 | Belcourt et al. | 340/172.5 |
| 3,350,695 | 10/1967 | Kaufman et al. | 340/172.5 |
| 3,374,486 | 3/1968 | Wanner | 340/172.5 |

*Primary Examiner*—Paul J. Henon
*Assistant Examiner*—Mark Edward Nusbaum
*Attorneys*—R. J. Guenther and William L. Keefauver

ABSTRACT: A general purpose computer program and special purpose apparatus for matching strings of alphanumeric characters are disclosed. The algorithm involved makes use of a current-character search list (augmented for all alternative characters) and a next-character search list (augmented for all successful character matches). These characters are portions of the test text to which the string to be matched is compared. Each character of the string to be matched is tested by the current character list, during which time the next character list is compiled. Then a new character is obtained, the next character list substituted for the current character list, and the process continues. The process terminates successfully when test text characters are exhausted, and terminates unsuccessfully when the searched text to be matched is exhausted.

INVENTOR
K. L. THOMPSON
BY R.O. Nimtz
ATTORNEY

TEXT MATCHING ALGORITHM

BACKGROUND OF THE INVENTION

1. Field of the Invention

This invention relates to data processing systems and, more particularly, to text matching arrangements for such systems.

It has become common to utilize data processing machines to process text as well as numerical data. Information retrieval and text editing arrangements, for example, are becoming more useful and in greater demand due to the explosion in scientific and technical literature. One of the basic machine capabilities for such applications is the ability to match text, either for gaining access to certain indexed materials or for making changes in the matched text. Since this is a basic requirement and must be performed many times, it is desirable that such capability be implemented to operate as rapidly as possible and to require as little machine complexity as is feasible.

2. Description of the Prior Art

It has been customary, in text matching, to test one unit at a time, usually a character, and to continue testing in a serial fashion. That is, the first character to be tested is compared to the first character to be matched. If successful, the second character to be tested is compared to the second character to be matched. If this comparison also produces a match, the process is continued, a character at a time, until the entire expression to be matched is in fact matched, or until a failure occurs. When a failure occurs, the testing sequence must return to the character in the expression to be tested which was the second character of the partially successful match. This character is then tested against the first character to be matched and the entire process repeated. Partially successful matches therefore give rise to multiple overlapped subgroup matching sequences requiring an elaborate accounting system to keep track of the status of the overall search.

BRIEF DESCRIPTION OF THE INVENTION

In accordance with the present invention, searches for matching strings of elemental units are conducted in a parallel fashion in that, at any one time, the search may be going on in a plurality of different substrings. This is accomplished by assuming that each new unit (character) may be the beginning of a matching expression, and testing it for that possiblity. If a match occurs, there is stored the identification of the next character to be matched. If a partial match or matches has already occurred, the new character is also matched against the next possible characters in each of those substrings. Successful matches here also result in the storage of the identifications of other possible next characters. When the tests for all of the possible current characters is completed, a new character to be tested is obtained and the stored identifications similarly tested one at a time. At this time, of course, the new character is also compared to the first character of the expression to be matched to initiate any possible new substring matches.

The list of stored next character identifications is preferably merely a list of pointers to the appropriate tests for those characters. The tests are then executed, one at a time, and a new list of next character tests assembled, one entry for each successful test.

The above described method and apparatus for implementing this method is considerably faster than prior art text matching methods. It has the further advantage, however, of being compatible with generalized forms of expressions to be matched. Up to the present, only literal expressions have been considered, i.e., expressions in which each unit (character) must be matched by one unit (character) on a one-for-one, identical, basis. More useful matching can be accomplished if room is left for alternatives for one or more characters.

An expression which is written so as to leave room for such alternative matches can be called a "regular expression" and is distinguished by the inclusion of special characters which serve as operators. That is, the operators in a regular expression are not characters to be matched, but directions on how to perform matches with other characters.

A regular expression, then, is a concatenation of characters and operators representing symbolically all of the possible character strings which produce successful matches. It is closely analogous to an algebraic expression in which operators are also used to indicate required relationships between operands. In an algebraic expression, for example, simple juxtaposition of symbols implies multiplication. In a regular expression, such juxtaposition represents a requirement for coincidence of the characters in that order. It is similar to the logical AND operator, but is implied rather than explicit.

As in algebraic expressions, the juxtaposition of characters gives rise to regular expression "terms" which can themselves be combined with other characters and/or terms by another operator. Terms in an algebraic expression, for example, can be related by the "+" and "−" operators. Similarly, terms in a regular expression can be related by the disjunctive operator (the OR operator). This operator operates much like the logical OR operator, indicating that either of two terms are alternates for successful matching. In its simplest form, the regular expression, therefore, is a string of one or more terms joined by OR operators. As in algebraic expressions, however, parentheses can be used to delimit juxtaposed characters, terms or entire expressions which are to be used as operands in a higher order regular expression. Moreover, an operator called the "closure" operator, can operate on any character, term or expression to indicate an indefinite number of repetitions of the operand, including zero repetitions. This operator provides a useful short-hand method of representing repetitions without explicit listing of the alternatives.

The commonly accepted definition of regular expressions found in the art includes only the juxtaposition operator (implied), the OR operator ("|") and the closure operator ("*"). Since many other useful operators can be defined, the term "extended regular expressions" has been used to indicate expression including any of these further operators. These might include, for example, the NOT operator, indicating any character (term, expression) but the operand, the exclusive OR operator, indicating either one, but not both, of two operands, operators satisfied by any single character, operators representing physical positions in the printed text (beginning of line, end of line, etc.), and so forth.

In further accord with the present invention, regular expressions can be recognized using the same technique as was described for literal expressions. The operators, however, cause branches in the search execution in order to explore all of the alternatives. When an alternative is encountered, one of the alternatives is appended to the current search list while the other is explored immediately. Matching on either alternative, of course, causes storage of the identification of the next character.

The major advantage of searches for regular expressions rather than for literal expressions lies in the far greater flexibility this gives to a single search, thereby easing considerably the task of specifying the expression to be searched for.

These and other features, the nature of the present invention and its various advantages, will be more readily understood upon consideration of the attached drawings and of the following detailed description of those drawings.

DETAILED DESCRIPTION

Figure 1:
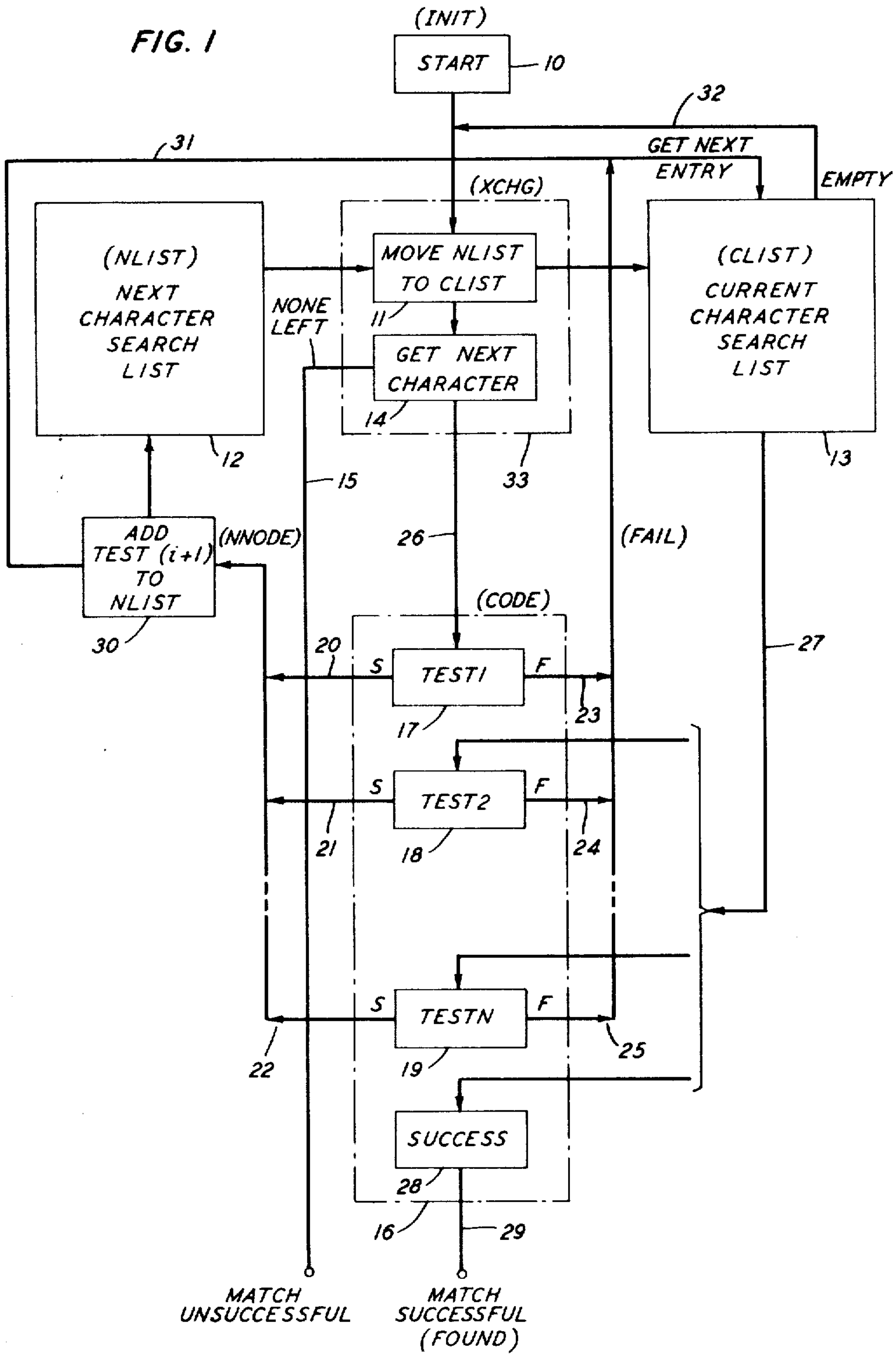
FIG. 1 is a functional block diagram of the text matching algorithm in accordance with the present invention.

Before proceeding with the detailed description of the drawings, it may be well to note that the present invention is concerned with matching at least two different coded sequences of electrically represented information. It is common in modern digital technology to represent alphabetic characters as well as numeric information in coded groups of pulses. In modern digital computers, for example, alphanumeric information is generally represented in some binary-coded form. Thus, a group of six pulse positions can be used to represent $2^6$ different alphanumeric characters (i.e., 64 different characters). Such representations are useful, for example, in representing computer generated information to a human observer. Indeed, it has lately become commonplace for the computer to be used for processing alphanumeric information itself in such contexts as machine searching and text editing.

One of the most basic alphanumeric information processing steps is that of matching, on a character-by-character basis, two different strings of alphanumeric data. Such text matching requires that each character of the searched text be compared, one character at a time, to the characters of the test text. Since the test text can theoretically be matched by any substring of the searched text, it must be assumed during such a search that each character of the searched text may be the beginning of a matching substring. For this reason, some form of organized search must be conducted and records kept on all of the partially successful text matches since it is not known ahead of time which of these partially successful matches will ultimately produce a completely successful match.

Once the character strings have been represented as coded sequences of electronic signals, such text matching can be easily accomplished by means of electronic apparatus. Such apparatus can take the form of a general purpose digital computer specially programmed to perform the text matching. On the other hand, special purpose circuitry, which is wired together so as to ensure the proper sequence of steps in the text matching procedure, can be used equally well. The present invention will be described with respect to both of these types of implementation. It is to be understood, however, that the implementation achieved by programming a general purpose computer is by far the superior alternative. This is true because of the wide availability of general purpose computers, the ease of programming these computers to perform the desired text matching, and the simplicity in modifying details of the procedure as circumstances warrant.

It can thus be seen that, in its broadest aspects, the present invention is an algorithm for matching at least two different strings of texts. In this connection, the term "algorithm" means any self-consistent set of ordered steps specifying definable operations upon data and leading to a particular result. This definition, while somewhat broader than the definition heretofore accepted in the field of mathematics, has nevertheless become standard in the computer programming art.

Turning to the drawings, in FIG. 1 there is shown a functional block diagram illustrating the operation of the text matching algorithm for literal expressions in accordance with the present invention. The illustration of FIG. 1 comprises the plurality of labeled boxes, each of which represents a subfunction in the text matching process and each of which can be implemented by programming a general purpose computer. One such implementation will be given in detail to illustrate the specific form of the programming routines.

In FIG. 1, box 10 represents the origin of the process and is connected by a directed arrow to box 11. Box 11 specifies that a list maintained by box 12 and called NLIST be transferred to box 13, labeled CLIST. Box 11 is connected by a directed arrow to box 14 which is labeled "GET NEXT CHARACTER" and specifies the function of retrieving the next character from the searched text. If the searched text is exhausted, an indication is provided by way of directed arrow 15 which indicates that the match has not been successful. That is, if the searched text is exhausted and a match has not yet been successful, it is clear that the searched text does not include a matching substring. Such a condition terminates the search and marks it as unsuccessful.

Box 14 is connected by a directed arrow to the dashed box 16 which represents the test text as a sequence of the individual character tests, one for each character of the test text, and in the sequence given by the test text. For convenience, these tests have been represented in FIG. 1 by boxes labeled TEST1, TEST2, etc., i.e., numerically identified test boxes 17, 18...19. Each of the test boxes 17 through 19 compares the character from the searched text obtained by box 14 to one of the characters of the test text and produces an indication of a successful (S) match on leads 20, 21 or 22, respectively, or of an unsuccessful (F) match on leads 23, 24 or 25, respectively. TEST1 box 17 is accessed by way of lead 26 from box 14. The remainder of the test boxes 18 through 19 are accessed by way of entries made in CLIST box 13 by way of lead 27.

The final box within dashed box 16 is success box 28 which, when it is arrived at, indicates that all the successive tests have been successful and, thus, that the test text has been successfully matched. An indication of this successful match condition is given by way of lead 29 which also terminates the text matching process with an indication of success.

Each successful test in boxes 17 through 19, as indicated on leads 20 through 22, enables box 30 to add the identification of the next successive test to the list in NLIST box 12. That is, a successful test in test box *i* causes the addition of an entry to NLIST 12. This entry identifies the next succeeding test box, i.e., test box ($i$+1), to NLIST box 12. Thereafter, CLIST box 13 is addressed by way of lead 31 to cause CLIST box 13 to provide its next entry as a command by way of lead 27 to enable the identified one of test boxes 17 through 19.

The manner in which the process illustrated in FIG. 1 operates will now be considered. In its broadest outline, the text matching algorithm in accordance with the present invention operates by maintaining two separate lists of individual character tests to be performed. Since only one character of the searched text is accepted at a time, these lists represent comparisons to be made between the current searched text character and identified ones of the test text characters. CLIST 13, for example, is a list of all of the tests 17 through 19 to which the currently available searched text character is to be applied. These identifications, of course, are utilized by way of lead 27 to enable each of the identified tests in succession.

NLIST 12, on the other hand, is a list of the test text character tests which are to be enabled when the next succeeding character is obtained by way of box 14. An entry is made in NLIST 12 for each successful character match indicated by test boxes 17 through 19. When CLIST 13 is exhausted, an indication on lead 32 causes box 11 to move the contents of NLIST 12 to CLIST 13. That is, when the current character search is completed, the next character search list complied during the previous current character search becomes the new current character search list. It will be noted that the sequence of the tests on lists 12 and 13 are immaterial, since each test must be performed on the same searched text character and the order of doing so does not affect the efficacy of the process.

The text matching algorithm described in connection with FIG. 1 is to be compared with heretofore proposed text matching algorithms in which each partially successful substring match is pursued until it ultimately produces a successful or an unsuccessful match. If the match proves to be unsuccessful, the matching process must then return to the test text character next succeeding the beginning of the discarded and partially successful match. This prior art matching algorithm requires elaborate record keeping in order to continue the search after each unsuccessful substring match.

The present invention. on the other hand, searches the text in a parallel fashion such that all possible character matches are attempted for each character as it is obtained. In this connection, it will be noted that immediately following the retrieval of the next character by box 14 in FIG. 1, an attempt is made by way of lead 26 to match the new character with the first character of the test text by way of the test box 17. Thus, partially successful matches indicated by the entries on NLIST 12 can be supplemented by a new partially successful match on the first character by box 17. Such parallel searching is extremely efficient, particularly when the test text comprise highly redundant character strings such as are found in the English language.

In summary, the text matching algorithm of the present invention comprises the following steps:

1. Compare each new character of the searched text to the first character of the test text.
2. Compare each new character of the searched text to the characters identified on a current list of test text characters.
3. For each successful character match, add the identification of the next test text character to a list of next character tests.
4. When the current list of test text characters is exhausted, substitute the list of next character tests for the current character test list, secure the next searched text character, and proceed to Step 1.
5. If the last test text character is successfully matched, the entire test text has been successfully matched; if the searched text is exhausted the test text cannot be successfully matched.

For convenience, the algorithm illustrated in FIG. 1 will be implemented by programming routines written in the FAP symbolic language suitable for assembly and execution on the IBM 7094 general purpose computer. A detailed explanation of this computer and of the FAP language can be found in the "IBM 7094 Principles of Operation," File 07094-01, Form A22-6703-B1, Copyright 1959, 1960, 1961, 1962 by International Business Machines Corporation. Similar implementations in other languages for other general purpose computers will be readily apparent to those skilled in the art.

Before the text matching algorithm illustrated in FIG. 1 can be executed, it is necessary to provide the test text testing facilities represented by dashed box 16 in FIG. 1. This may be done in many different ways, including program sequences written by the individual programmer. It is considerably more convenient, however, particularly where a number of different test texts are to be matched, if the testing sequence can be generated automatically in response to the test text itself. One such automatic test generating facility will be illustrated as a test text compiler written in the ALGOL 60 language. This language is well known to those skilled in the programming art and is described in "Report on the Algorithmic Language ALGOL 60," by P. Naur and appearing in Communications of the Association for Computing Machinery, Vol. 3, page 299, May 1960.

A compiler routine for assembling FAP instructions for the test code required by a dashed block 16 of FIG. 1 and written in the ALGOL 60 language is shown in Table I.

TABLE I

Literal Expression Test Compiler

```
procedure compile;
begin
  integer char, pc;
  integer procedure get character; code;
  integer procedure command (op, address, tag, decrement);
    code;
  own integer eof;
  integer array code [0:300];
  pc := 0;
  advance:
  char := get character;
  if char = eof then go to end-of-file;
  code[pc] := command('txl, 'fail', 1, char-1);
  code[pc+1] := command('txh, 'fail', 1, char);
  code[pc+2] := command('tsx, 'nnode', 4);

  pc := pc+3;
  go to advance;
 end-of-file:
  code[pc] := command('tra, 'found');
  pc := pc+1;
end;
```

It will be noted that the programming routine of Table I includes the functions "get character" and "command." The former function serves to obtain the next succeeding character of the test text. The latter serves to compile a FAP instruction having the fields specified in its arguments. That is, the instruction fields are given in the sequence: Operation code field, address field tag field, and decrement field, all in accordance with well-known FAP assembly language terminology. The "eof" symbol stands for an end-of-file indication following the last character of the test text. This may be any suitable character, arbitrarily chosen, and therefore has not been explicitly defined in Table I.

The compiler illustrated in Table I serves to generate the code sequence which comprises the contents of dashed box 16 in FIG. 1. An illustration will make this apparent. If, for example, it is assumed that the test text comprises the string ABCD, then the compiler of Table I will generate the code sequence shown in Table II.

TABLE II

Illustrative Test Code for ABCD

| | | | |
|---|---|---|---|
| CODE | TXL | FAIL,1,*A*-1 | TEST FOR A |
| CODE | TXH | FAIL,1,*A* | |
| CODE | TSX | NNODE,4 | |
| CODE | TXL | FAIL,1,*B*-1 | TEST FOR B |
| CODE | TXH | FAIL,1,*B* | |
| CODE | TSX | NNODE,4 | |
| CODE | TXL | FAIL,1,*C*-1 | TEST FOR C |
| CODE | TXH | FAIL,1,*C* | |
| CODE | TSX | NNODE,4 | |
| CODE | TXL | FAIL,1,*D*-1 | TEST FOR D |
| CODE | TXH | FAIL,1,*D* | |
| CODE | TRA | FOUND | TEST TEXT EXHAUSTED |

In Table II the alphabetic characters within quotation marks represent binary coded equivalents of those characters. Thus, if the character A is coded as 010001, the storage cells of the decrement of the first instruction of Table II will contain 010000 (010001–000001).

It can be seen that the code of Table II provides three instructions for each character of the test string. A first instruction tests to see if the searched text character in index register 1 is equal to or less than the test text character minus 1. If so, a transfer is taken to a location labeled FAIL. The next instruction tests to see if the searched text character in index register 1 is greater than the test text character and, if so, control is likewise transferred to FAIL. If neither of these tests result in a transfer, the searched text character matches the test text character and the third instruction transfers control to a location labeled NNODE and saves the current location in index register 4.

The location NNODE is the beginning of a subroutine which corresponds to the functional block 30 in FIG. 1. The contents of index register 4, incremented by one, represents the location of the next test in Table II. The last entry of Table II transfers control to a location FOUND, indicating that the text matching was successful. This corresponds to box 28 in FIG. 1. The actual procedure to be followed when the match is successful depends upon the context in which the present invention is used and has not been specified in Table II. This procedure, of course, can vary all the way from terminating the process at this point and putting out an indication of successful match or can comprise a transfer to the next step in a larger data processing procedure.

In Table III, there is shown the plurality of computer program subroutines written in the FAP assembly language which are necessary to implement the balance of the text matching process illustrated in FIG. 1.

TABLE III

Search Execution Subroutines

NNODE SUBROUTINE–ADDS ONE ENTRY TO THE NEXT CHARACTER SEARCH LIST

```
NNODE AXC **, 7 LOAD NCNT INTO INDEX REGISTER 7
NNODE PCA ,4 GET CURRENT LOCATION IN CODE
NNODE ACL TSXCMD ADD TSXCMD INSTRUCTION TSX 1,2
2
NNODE SLW NLIST, 7 APPEND NEW ENTRY TO NLIST
NNODE TXI *+1, 7, -1 INCREMENT NCNT BY ONE
NNODE SCA NNODE, 7 SAVE NEW NCNT IN ADDRESS OF NNODE
NNODE TRA 1, 2 RETURN TO NEXT ENTRY ON CLIST
*
TSXCMD TSX 1, 2 NLIST GENERIC INSTRUCTION
* CLIST BSS 50 RESERVE STORAGE FOR CLIST
NLIST BSS 50 RESERVE STORAGE FOR NLIST
```

INIT SUBROUTINE–INITIALIZES FOR EXPRESSION SEARCH

```
*
INIT SCA NNODE, 0 INITIALIZE NCNT AT ZERO
     TRA XCHG START FIRST CHARACTER SEARCH
*
*
```

XCHG SUBROUTINE–STARTS NEW CHARACTER SEARCH

```
XCHG LAC NNODE, 7 LOAD NCNT INTO INDEX REGISTER 7
     AXC 0,6 LOAD ZERO INTO INDEX REGISTER 6
LOOP TXL ADCMD, 7, 0 IF NCNT ZERO, GO TO ADCMD
LOOP TXI *+1, 7, 1 DECREMENT NCNT BY ONE
LOOP CAL NLIST, 7 GET NXT NLIST ENTRY (START AT BTM)
LOOP SLW CLIST, 6 10 STORE IN CLIST (START AT TOP)
LOOP TXI LOOP, 6, -1 INCR. CCNT BY ONE AND GO TO LOOP
ADCMD CAL TRACMD GET TRA XCHG INSTRUCTION
ADCMD SLW CLIST, 6 APPEND TO END OF CLIST
ADCMD SCA CNODE, 6 SAVE NCNT IN ADDRESS OF CNODE
ADCMD SCA NNODE, 0 INITIALIZE NEW NCNT AT ZERO
ADCMD TSX GETCHA, 4 GET NEXT CHARACTER TO BE TESTED
ADCMD PAX ,1 SAVE CHAR IN INDEX REGISTER 1
ADCMD TSX CODE, 2 START SEARCH AT TOP OF CODE
ADCMD TRA CLIST CONTINUE SEARCH IN CLIST
*
TRACMD TRA XCHG CONST INSTRUCTION FOR ABOVE SUBR.
*
```

FAIL SUBROUTINE–COMMON RETURN FOR MATCH FAILURES

```
*
FAIL TRA 1, 2 RETURN TO NEXT ENTRY ON CLIST
```

The first subroutine in Table III, called the NNODE subroutine, serves to add one entry to the next character search list identified as NLIST 12 in FIG. 1. For the purposes of this subroutine, a count of the number of entries in NLIST is maintained in index register 7. Thus, the first instruction of the NNODE subroutine loads this count into index register 7. The second instruction places the address of the location from which this subroutine was called into the accumulator register from index register 4. The third instruction adds the contents of symbolic location TSXCMD to the contents of the accumulator register. The accumulator register then contains the binary equivalent of an instruction having TSX in the operation field, having the location one past the calling location in the address field and the numeral 2 in the tag field.

In the fourth instruction, the contents of the accumulator register are appended at the end of NLIST at the position indicated by the contents of index register 7. At the fifth instruction of NNODE, the NLIST count is incremented by one and, at the sixth instruction, this new count is stored in the address of the location NNODE. The final instruction of the NNODE subroutine returns control to the next entry on CLIST as indicated by the contents of index register 2.

Following the NNODE subroutine is the generic command TSXCMD and blocks of storage reserved for the CLIST and NLIST lists themselves.

The second subroutine on Table III, called the INIT subroutine, is the equivalent of box 10 in FIG. 1 and initializes for an expression search. INIT includes only two instructions, the first of which initializes the NLIST count at zero, and the second of which is a transfer to the XCHG subroutine.

The third subroutine in Table III is the XCHG subroutine which is represented in FIG. 1 by the dashed box 33. As is noted in FIG. 1, the first function to be performed is to move the contents of NLIST 12 to CLIST 13. To this end, the first instruction loads the NLIST count into index register 7 while the second loads zero into index register 6. The third instruction, labeled LOOP, tests the contents of index register 7 (the NLIST count) and if it is equal to or less than zero, transfers control to the location ADCMD. The next instruction decrements the NLIST count by one and is followed by an instruction which retrieves one entry from NLIST, to be immediately stored in CLIST by the following instruction. The next instruction increments the CLIST count in index register 6 by one and transfers control to the instruction LOOP.

It can be seen that the five instructions starting at LOOP serve to transfer the contents of NLIST to CLIST. The process is terminated when the NLIST count is reduced to zero, as indicated by the test at location LOOP. Control is then transferred to instruction ADCMD at which time the instruction at location TRACMD is placed in the accumulator register. The contents of the accumulator register are then placed at the end of CLIST. The new CLIST count in index register 6 is placed in the address of a location CNODE (to be described hereinafter). The new NLIST count is reinitialized at zero and a transfer takes place to a subroutine which obtains the next character to be tested. A FAP subroutine suitable for this purpose forms a portion of the subject matter of the copending application of M. D. McIlroy (Case 1), Ser. No. 417,973, filed Dec 14, 1964, and assigned to applicant's assignee. This new character is stored in index register 1 for ease in making subsequent comparison tests. Thereafter a transfer takes place to the first test representing the test text, corresponding to box 17 in FIG. 1. This test, of course, corresponds to the initial location in the programming sequence of Table II. When this test is completed, control is transferred to the first entry on CLIST to complete the current character search.

The last subroutine in Table III is the FAIL subroutine and comprises a single instruction which transfers control to the next entry on CLIST, as represented by the contents of index register 2.

It can be seen that the FAP coding of Tables II and III serve to implement the algorithm outlined in FIG. 1. In general, each functional requirement of FIG. 1 is implemented by a program subroutine which is called into operation when that function is required. The leads in FIG. 1, therefore, actually represent transfers between the various routines as determined by the described condition. The lists illustrated by boxes 12 and 13 are no more than transfer instructions to appropriate location in the block of coding illustrated by dashed box 16 in FIG. 1 and shown in Table II. Since these tests need be repeated only once to be executed any desired number of times, substantial amounts of redundant test coding are avoided. The bookkeeping operations for keeping track of all partially successful string matches is automatically taken care of by the entries in CLIST 13 and NLIST 12. As previously noted, the parallel search technique embodied in this algorithm requires that each searched text character be considered for matching only once during the entire string matching sequence.

Figure 2:
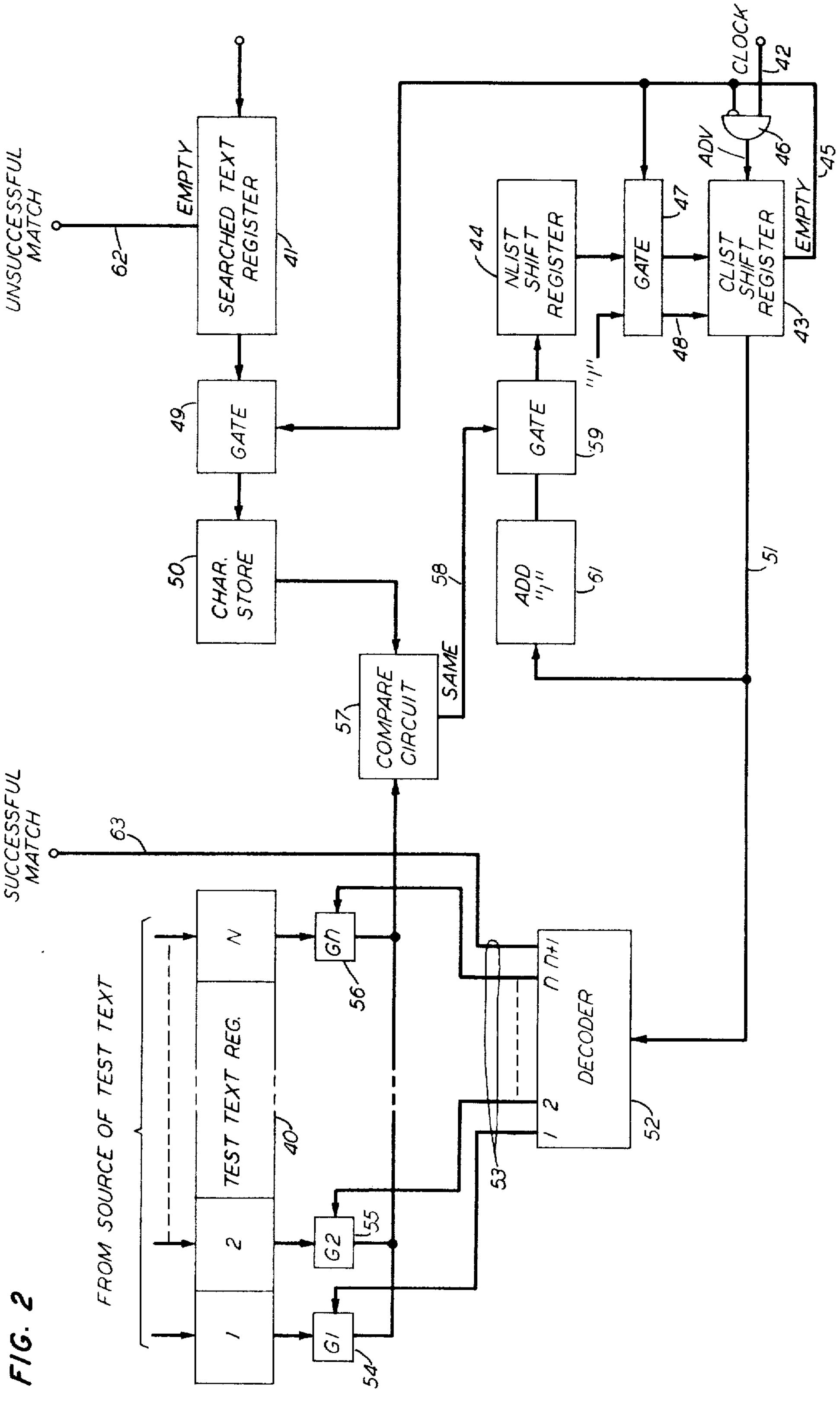
FIG. 2 is a schematic block diagram of special purpose electronic apparatus for practicing the text matching of the present invention.

Although it is less likely that the algorithm of the present invention will be implemented by means of special purpose circuitry, such circuitry is illustrated in fig. 2 to indicate the general nature of the algorithm involved. Thus, in FIG. 2 a test string register 40 is utilized to store the test text characters in the proper sequence as represented by the numbered subdivisions of register 40. A searched text register 41 stores the searched text which is to be matched against the test text string. The entire circuit of FIG. 2 is driven by clock pulses on clock pulse lead 42.

The CLIST and NLIST lists are implemented in FIG. 2 by shift registers 43 and 44, respectively. Each of shift registers 43 and 44 is adapted to store a plurality of coded test identifications corresponding to the numerical indentifications of the test text characters in register 40. That is, test text character 01 is identified in registers 43 and 44 by a coded representation of the numeral 1. The remaining test text characters are similarly identified in registers 43 and 44.

Assuming initially that CLIST shift register 43 is empty, an empty indication on lead 45 disables inhibit gate 46 to prevent the application of clock pulses from lead 42 to advance shift register 43. At the same time, the signal on lead 45 enables gate 47 to transfer, in parallel, the contents of NLIST shift register 44 to CLIST shift register 43. At the same time, a coded representation of the number 1 is transferred to the first or leftmost storage position of CLIST shift register 43 by way of lead 48. This same signal on lead 45 also enables gate 49 to transfer one character of the searched text string in register 41 to character store 50.

After the termination of the empty signal on lead 45, the inhibit gate 46 is reenabled and a clock pulse is applied to shift register 43 to advance one test character identification from shift register 43 to lead 51. This coded identification is applied to decoder 52 which decodes the numerical code and applies a signal to the correspondingly numbered one of output leads 53. Since the first coded identification to be shifted out of shift register 43 is the one inserted by lead 48, the lead identified by number 1 from decoder 52 is energized to enable the corresponding gate 54. Other coded identifications, of course, would operate in a similar manner to enable one of the other gates 55 through 56.

When thus enabled, the operated one of gates 54 through 56 supplies the corresponding one of the test text characters in register 40 to a compare circuit 57. At the same time, the contents of character store 50 are also applied to compare circuit 57. If these characters are identical, compare circuit 57 produces an output on lead 58 to enable gate 59. If the characters are not identical, no output is produced by compare circuit 57.

The output of shift register 43 on lead 57 is applied to adding circuit 61, where it is incremented by one, and then applied to gate 59. If gate 59 is enabled by a signal on lead 58, the incremented coded identification from circuit 61 is supplied to NLIST shift register 44. It can thus be seen that each successful character match operates to store in register 44 an identification of the next test text character in register 40.

The next clock pulse on lead 42 shifts the next test character identification out of register 43 and the above described process is repeated. If no character match is indicated by a signal on lead 58, nothing further happens until the next clock pulse appears on lead 42. This process is continued until CLIST shift register 43 is again empty and again produces an output signal on lead 45. At this time the entire process is repeated, this time with a new searched text character in character store 50.

If the searched text store 41 is emptied, a signal is produced on output lead 62 indicating failure to match the test text. If the test text character identification exceeds by one the last (*nth*) test text character, an output signal is produced on lead 63 indicating that the test text has been successfully matched.

The circuit arrangement of FIG. 2 can be implemented by combining many well-known circuits within the skill of persons of ordinary skill in the logic circuit art. As an example, the entire circuit of FIG. 2 can be realized with integrated circuit chips supplied commercially by the Digital Equipment Corporation, Maynard, Massachusetts, and described in their C-105 catalog entitled "The Digital Logic Handbook—Flip Chip Modules," 1967 Edition, Number 1750, Mar. 1967. The various circuits of FIG. 2 may be realized with integrated logic circuits as detailed below:

| Circuit element | Description of Digital Equip. Corp implementation | Catalog Page |
|---|---|---|
| Register 40 | R202 Flip-flops | 71 |
| Register 41 | do | 71 |
| Shift Register 43 | Kit D007, using R205 Flip-flops | 261 |
| Shift Register 44 | do | 261 |
| Gate 46 | B113 NAND/NOR Gates | 110 |
| Gate 47 | R002 Diode Networks | 57 |
| Gate 48 | do | 57 |
| Gate 49 | do | 57 |
| Store 50 | R202 Flip-flops | 71 |
| Decoder 52 | R151 Decoder | 66 |
| Gates 54–56 | R002 Diode Networks | 57 |
| Compare Circuit 57 | R141 AND/NOR Gate | 65 |
| Gate 59 | R002 Diode Networks | 57 |
| Add "1" Circuit 61 | Parallel Adder, using R201 Flip-flop, R111 Diode gates and R602 Pulse Amplifier. | 190 |

The "Logic Handbook" also includes specific instructions for combining these basic circuits, for hardware, wiring, power supplies and cooling (page 221 *ff*), and a number of specific applications (page 175 *ff*).

It can be seen that the circuit of FIG. 2 operates to execute the same text matching algorithm as is illustrated in FIG. 1 and Tables II and III. It is apparent, of course, that numerous other specific embodiments of both circuit apparatus and programmed general purpose computers could be readily devised by those skilled in the art to practice the inventive algorithm representing applicant's contribution to the art. It is also readily apparent that the only real difference between the implementations of FIGS. 1 and 2 is in the specific form of apparatus which is utilized to practice the method of text matching, which method forms the subject matter of applicant's invention.

The specific embodiments of applicant's invention heretofore described have been limited to the matching of texts which are explicit and invariable, i.e., literal expressions. A far more useful form of test text is the so-called "regular expression" in which operators are utilized to indicate alternative species of a generic expression, each of which will produce a successful match. Such operators include the disjunctive operator (OR) and the closure operator (indicating N repetitions of the substring operated upon, where N has any value between zero and infinity). The disjunctive and closure operators will be considered in detail, since they are illustrative and, moreover, each provide for alternative branching in the search operation.

The disjunctive OR operator can be represented by the symbol "|" and indicates that either of the substrings to the right and the left of the symbol will satisfy the test string for matching purposes. The closure operator is represented by the symbol "*" and indicates that the immediately preceding character or string of characters will provide a match regardless of the number of times that character or substring is repeated, including zero repetitions. If the operands to which these operators refer exceed a single character, then parentheses can be used to delimit the appropriate substrings. Thus, the regular expression

A(B | C)*D/ (1)

can be matched by any one of the following strings:

AD
ABC
ACD
ABBD
ACCD
ABCD
ACBD
ABCB, etc.

Since the parentheses in the above regular expression serve only as delimiters and do not otherwise affect the meaning of the regular expression, such an expression can be translated to the so-called "reverse polish" form in which all parentheses are omitted and the operand and operators are placed in such a sequence that the operands for each operator are unambiguously specified. Specifically, the operand(s) for each operator immediately precedes that operator such that if the operations are performed in the sequence in which they appear from left to right, the results of each such operation can become the operand for a succeeding operator. Using this notation, all juxtaposition operators must be made explicit, and are represented by the symbol "·".

Returning to the regular expression (1), this expression can be written in reverse polish form as follows:

ABC|*·D· (2)

It will be noted that the juxtaposition operator is essential for the reverse polish notation in order that this expression uniquely represent the regular expression. Thus, the expression "AB|C" is expressed in reversed polish notation as "AB·C|" while the expression "A|BC" is expressed as "ABC·|". In each case, the reverse polish expression is interpreted by proceeding from the left to the first operator, performing that operation on the two immediately preceding operands to form a new compound operand, proceeding to the next operator, performing that operation on the two immediately preceding operands, either or both of which may be compound operands, and so forth.

If regular expressions are written in the reverse polish form, the regular expression test compiler of Table IV can be used to assemble the test code which recognizes and uses the closure and OR operators, i.e., to test for regular expressions.

TABLE IV

Regular Expression Test Compiler

```
procedure compile;
begin
  integer char, 1c, pc;
  integer procedure get character; code;
  integer procedure command (op, address, tag, decrement);
    code;
  integer procedure value (symbol); code;
  integer procedure index (character); code;
  integer array stack [0:10], code [0:300];
  switch switch := alpha, juxta, closure, or, eof;
  1C := pc := 0;
advance:
  char := get character;
  go to switch (index(char));
alpha:
  code [pc] := command ('tra', value ('code')+pc+1,0,0);
  code [pc+1] := command ('txl', value ('fail'),1,char-1);
  code [pc+2] := command ('txh', value('fail') ,1,char);
  code [pc+3] := command('tsx', value('nnode'),4,0);
  stack[lc] := pc;
  pc := pc+4;
  1c := 1c+1;
  go to advance;
juxta;
  1c := 1c-1;
  go to advance;
closure:
  code[pc] := command('tsx', value,('cnode'),4,0);
  code[pc+1] := code[stack[lc-1]];
  code[stack[lc-1]] := command ('tra', value ('code')
    +pc,0,0);
  pc := pc+2;
  go to advance;
or
  code [pc] := command ('tra', value ('code')+pc+4,0,0);
  code[pc+1] := command ('tsx', value ('cnode'),4,0);
  code[pc+2] := code[stack[1c-1]]:
  code[pc+3] := code[stack[1c-2]];
  code[stack[1c-2]] := command ('TRA', value(code')
    +pc+1,0,0);
  code[stack[1c-1]] := command('tra',value('code')+pc+
    4,0,0);
  pc := pc+4;
  1c := 1c-1;
  go to advance;
eof:
  code[pc] := command('tra',value('found'),0,0);
  pc := pc+1;
end;
```

The procedure of Table IV is similar to that of Table I, but further includes appropriate compiling sequences for the OR and closure operators. Furthermore, the code compiled for each alphanumeric character is preceded by a transfer instruction which is initially compiled to effect a transfer to the next succeeding instruction, but which may at a later time be modified to effect a transfer to other instructions of the testing sequence. In general, these transfer instructions are used to establish changeable linkages between the various character tests and will be described in detail hereinafter.

The function "index" obtains an integer representing the numerical priority of the contents of "char" corresponding to the order in the "switch" statement. The array "stack" maintains a push-down list of the locations of the various character tests. It is used to identify operands for the closure and OR operators. The juxtaposition position operator merely removes the top entry on "stack" to indicate a compound operand.

The compilation sequence for the closure operator, for example, generates an instruction causing a transfer to a subroutine CNODE which serves to effectively branch the current search path. The compilation sequence for the OR operator likewise uses the same subroutine to effect search branching. The operation of these compiling routines can be better seen by considering the compiled code of Table V which results from the operation of the compiler of Table IV on the reverse polish regular expression (2).

TABLE V

Test Code Compiled from "ARC *D

| | | | | |
|---|---|---|---|---|
| CODE | TRA | CODE+1 | 0 | A |
| CODE | TXL | FAIL,1,*A*–1 | 1 | |
| CODE | TXH | FAIL,1,*A* | 2 | |
| CODE | TSX | NNODE,4 | 3 | |
| CODE | TRA | CODE+16 | 4 | B |
| CODE | TXL | FAIL,1,*B*–1 | 5 | |
| CODE | TXH | FAIL,1,*B* | 6 | |
| CODE | TSX | NNODE,4 | 7 | |
| CODE | TRA | CODE+16 | 8 | C |
| CODE | TXL | FAIL,1,*C*–1 | 9 | |
| CODE | TXH | FAIL,1,*C* | 10 | |
| CODE | TSX | NNODE,4 | 11 | |
| CODE | TRA | CODE+16 | 12 | \| |
| CODE | TSX | CNODE,4 | 13 | |
| code | TRA | CODE+9 | 14 | |
| CODE | TRA | CODE+5 | 15 | |
| CODE | TSX | CNODE,4 | 16 | * |
| CODE | TRA | CODE+13 | 17 | |
| CODE | TRA | CODE+19 | 18 | D |
| CODE | TXL | FAIL,1,*D*–1 | 19 | |
| CODE | TXH | FAIL,1,*D* | 20 | |
| CODE | TSX | NNODE,4 | 21 | |
| CODE | TRA | FOUND | 22 | EOF |

Figure 3:
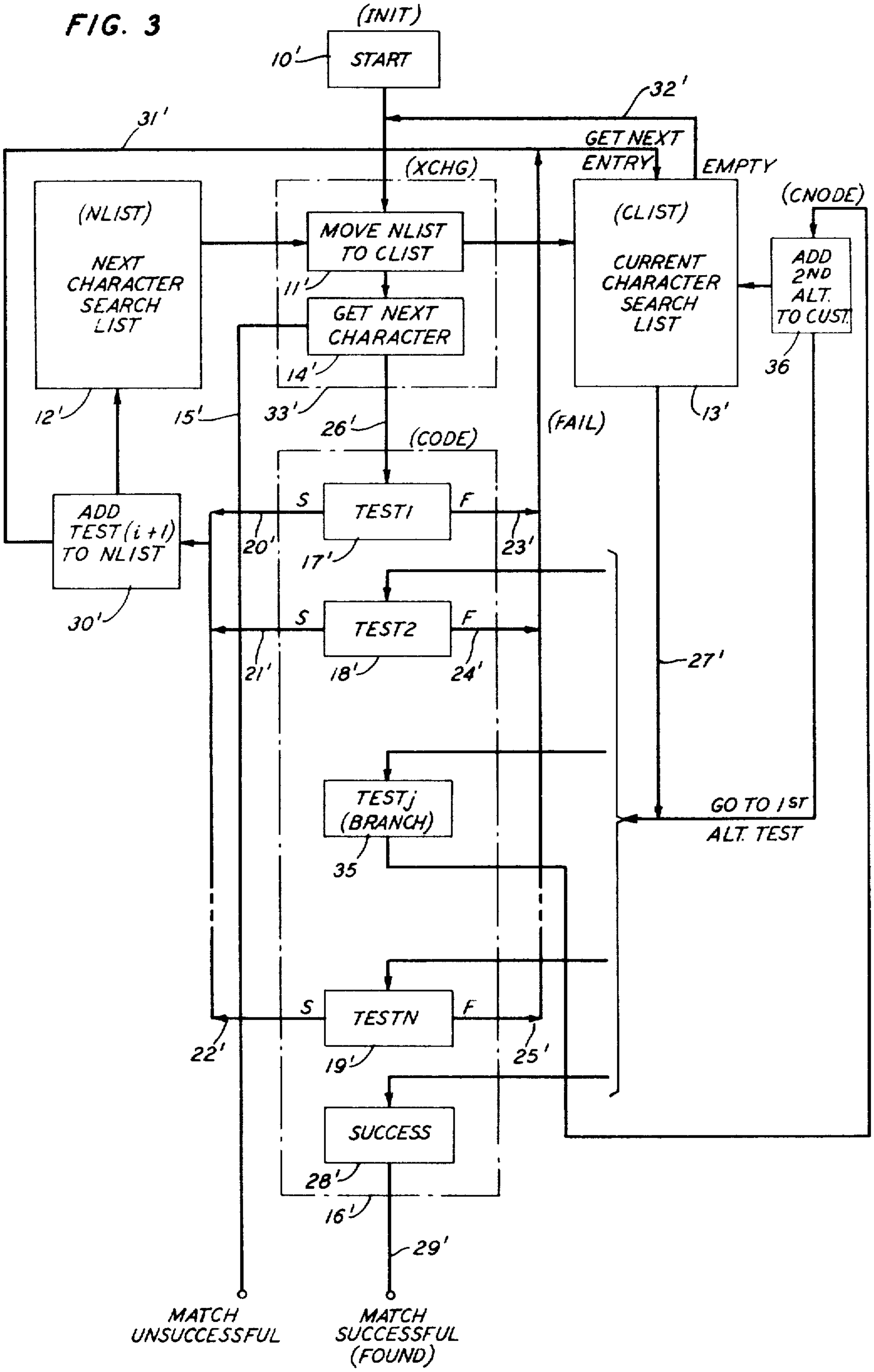
FIG. 3 is a functional block diagram of the modified and improved version of the text matching algorithm of the present invention useful for matching regular expressions.

Before proceeding to a more detailed description of the code of Table V, it is desirable to consider the functional block diagram of FIG. 3.

In FIG. 3 there is shown a functional block diagram of a text matching algorithm identical to that illustrated in FIG. 1 but further including facilities for handling search branching when the test text is in the form of a regular expression. Elements of FIG. 3 which correspond identically to the elements of FIG. 1 have been identified by the same reference numeral with a prime affixed thereto. These elements will not be discussed in detail since they are identical to the corresponding elements of FIG. 1 and operate to cooperate in the same manner.

Also included in FIG. 3 is a test box 35 which represents the compiled code for a regular expression operator rather than an alphanumeric character. Since these operators do not require matching with respect to themselves but only indicate how the matching is to be performed on associated alphanumeric characters, test box 35 performs no actual character testing, instead test box 35 permits branching in the current character matching. Since at least two alternative character tests are required for a branch, test box 35 enables box 36 which adds one of these alternatives to the current character test list CLIST 13' and then proceeds to the test box in block 16' corresponding to the other alternative. The way in which this search branching is effected for the disjunctive and closure operators can be seen with reference to Table V. It is first necessary, however, to indicate the manner in which CLIST 13' is supplemented by way of box 36. Table VI is a FAP subroutine having the name CNODE and which performs the function of box 36.

TABLE VI

Regular Expression Branching Subroutine

CNODE SUBROUTINE - ADDS ONE ENTRY TO THE CURRENT CHARACTER SEARCH LIST

CNODE AXC **,7 LOAD CCNT INTO INDEX REGISTER 7

CNODE CAL CLIST,7 GET LAST ENTRY ON CLIST (TRA XCHG)

CNODE SLW CLIST+1,7 MOVE DOWN BY ONE LOCATION

CNODE PCA ,4 GET CURRENT LOCATION IN CODE

CNODE ACL TSXCMD ADD TSXCMD INSTRUCTION TSX 1, 2

CNODE SLW CLIST,7 APPEND NEW ENTRY TO CLIST

CNODE TXI *+1,7,–1 INCREMENT CCNT BY ONE

CNODE SCA CNODE,7 SAVE NEW CCNT IN ADDRESS OF CNODE

CNODE TRA 2,4 RETURN TO TWO PAST CALLING LOCATION

It can be seen that the above subroutine adds a transfer to one location past the current location in CODE to CLIST and returns to CODE at a location two positions past the calling location. The first operation adds the second alternative to CLIST and the second operation returns to the first alternative.

Returning to Tables IV and V, the function of the initial transfers in each alphanumeric test sequence can now be taken up. Initially when the character tests are assembled, this transfer is merely a transfer to the current location plus one, thus linking the immediately preceding test with the current test (thus assuming juxtaposition). If the character is an operand for one of the other regular expression operators, this initial linking transfer is modified such that the operand tests are appropriately linked for that operator.

In the case of the OR operator ("|"), the compiled code comprises the linking transfer (which links the immediately preceding character test to the next succeeding test, in this case the code compiled for the closure operator), followed by a transfer to the CNODE subroutine. Since the OR operator has two operands, transfers to the test code for each of these operands are compiled at this point. As can be seen from Table IV, this is accomplished by moving the linking transfers from the beginning of these test code blocks to the locations following the transfer to CNODE. The linking transfer at the beginning of the first operand is compiled to link the immediately preceding test to the OR block of coding while the linking transfer between the two operands is altered to link the first operand to the test code immediately succeeding the OR code.

The test code for the closure operator comprises a transfer to the subroutine CNODE followed by a transfer to the single operand for that operator. The linking transfer for that operand is modified to link the immediately preceding test code to the closure code. It will be noted that there is only one operand for the closure operator. However, the test code and subroutines operate to initially skip the transfer to the closure operand and thus enter the next succeeding block of test code. In this way, the possibility of the closure operand being repeated zero times is accommodated. Furthermore, each time the closure operand is detected, the closure test is added to NLIST, thereby allowing any number of repetitions of the closure operand.

From the above description, it is apparent that the algorithm illustrated in FIG. 3 can be used for text matching of regular expressions of any desired complexity. The use of regular expression operators greatly simplifies the writing of test text and permits a wide variety of matchings conditions. It is this great flexibility combined with the extremely rapid execution of the algorithm which renders the present invention such a great improvement over prior art algorithms.

It is to be understood that the above described arrangements are merely illustrative of numerous and varied other arrangements which may constitute applications of the principles of the invention. Such other arrangements may readily be devised by those skilled in the art without departing from the spirit or scope of this invention.

I claim:

1. Apparatus for detecting matches between strings of information-representing signals comprising:

means for comparing each subunit of a first string to the first subunit of a second string;

means for recording the identification of that subunit of the second string which subunit follows each matched subunit of the first string;

means for comparing each identified subunit of the second string to the next succeeding subunit of the first string;

means for indicating a successful match when all subunits of the second string are compared; and means for indicating an unsuccessful match when all subunits of the first string are compared.

2. The method of detecting matches between strings of electronically coded subunits comprising the steps of:

1. comparing each subunit of a first string to the first subunit of a second string;
2. recording the identification of that subunit of the second string following each matched subunit of the first string;
3. comparing each identified subunit of the second string to the next succeeding subunit of the first string;
4. indicating a successful match when all subunits of the second string are compared; and
5. indicating an unsuccessful match when all subunits of the first string are compared.

3. Apparatus for detecting matches between two alphanumeric expressions represented by electronically coded characters comprising:

means for comparing each character of a first one of said expressions to all currently possible matching characters of the second one of said expressions;

means for compiling a first list of all possible next characters of said second expression in response to successful matches to the currently compared character of said first expression, said possible next characters becoming said currently possible matching characters for the next character of said first expression; and means for obtaining the characters of said first expression, one at a time, for said comparisons.

4. Apparatus according to claim 3 further comprising:

means for compiling a second list of all currently possible matching characters in response to disjunctive operators in said first expression;

said obtaining means including means for substituting said first list for said second list.

5. The method of detecting matches between two alphanumeric expressions represented by electronically coded characters comprising the steps of:

1. comparing each character of a first one of said expressions to all currently possible matching characters of the second one of said expressions;
2. compiling a first list of all possible next characters of said second expression in response to successful matches to the currently compared character of said first expression, said possible next characters becoming said currently possible matching characters for the next character of said first expression; and
3. obtaining the characters of said first expression, one at a time, for said comparisons.

6. The method according to claim 5 further comprising the steps of:

1. compiling a second list of all currently possible matching characters in response to disjunctive operators in said first expression; and
2. substituting said first list for said second list.

7. Signal matching apparatus comprising:

storage means for a first sequence of signals having identified subsequences;

storage means for a second sequence of signals having correspondingly-sized subsequences, said subsequences being made available one at a time;

means for comparing identified ones of the subsequences of said first sequence to a currently available subsequence of said second sequence;

first means for storing subsequence identifications for said first sequence corresponding to the next succeeding subsequence following each matched subsequence of said first sequence;

second means for storing subsequence identifications for said first sequence, means for transferring subsequence identifications from said first storage means to said second storage means; and means responsive to identifications stored in said second storage means for selectively enabling said comparing means.

8. A method for a data processing system for matching strings of electronically coded characters comprising the steps of:

1. maintaining lists of current and next succeeding character matching tests;
2. adding one test to the current character test list for each alternative match;
3. adding one test to the next character test list for each successful match;
4. performing the matching tests on the current character test list for a current character; and
5. performing the matching tests on the next character test list for the next succeeding character.